(12) United States Patent
Sawada et al.

(10) Patent No.: US 7,944,590 B2
(45) Date of Patent: May 17, 2011

(54) BOX FOR IMAGE READING APPARATUS, IMAGE READING APPARATUS AND IMAGE FORMING APPARATUS

(75) Inventors: Kenji Sawada, Toyokawa (JP);
Masahiko Tanaka, Toyokawa (JP);
Yukinobu Iguchi, Hamamatsu (JP);
Akihiro Nishida, Shinshiro (JP)

(73) Assignee: Konica Minolta Business Technologiges, Inc., Chiyoda-Ku, Tokyo (JP)

( * ) Notice: Subject to any disclaimer, the term of this patent is extended or adjusted under 35 U.S.C. 154(b) by 840 days.

(21) Appl. No.: 11/987,106

(22) Filed: Nov. 27, 2007

(65) Prior Publication Data

US 2008/0137158 A1 Jun. 12, 2008

(30) Foreign Application Priority Data

Nov. 28, 2006 (JP) .................................. 2006-320640

(51) Int. Cl.
*H04N 1/04* (2006.01)
(52) U.S. Cl. ......... 358/474; 358/496; 358/497; 358/498
(58) Field of Classification Search .................. 358/474, 358/497, 498, 496
See application file for complete search history.

(56) References Cited

U.S. PATENT DOCUMENTS

| 5,335,083 | A | * | 8/1994 | Nagane | ......................... 358/400 |
| 5,805,307 | A | * | 9/1998 | Park | .............................. 358/471 |
| 7,161,716 | B1 | | 1/2007 | Kawasaki et al. | |

FOREIGN PATENT DOCUMENTS

| JP | 11-69104 A | 3/1999 |
| JP | 2001-83628 A | 3/2001 |

* cited by examiner

*Primary Examiner* — Houshang Safaipour
(74) *Attorney, Agent, or Firm* — Buchanan Ingersoll & Rooney PC (57) ABSTRACT

A box for an image reading apparatus, the box comprising a box body and a reinforcing member, the box body comprising a rectangular frame and a base plate fixed to the rectangular frame, and the reinforcing member being attached to the box body. The reinforcing member has a downwardly drawn area, upwardly drawn areas which are adjacent to the downwardly drawn area on front side and rear side for placing a reading block without interfering with the movement of an original document scanning unit and a cutout portion for disposing at least an image processing unit formed from the downwardly drawn area to end-of-scan side in the subscanning direction of the box body. An image reading apparatus having reduced thickness is provided by employing this box. An image forming apparatus in which height position of the image reading apparatus is set to such a height position that allows easy operation is provided.

18 Claims, 6 Drawing Sheets

BOX FOR IMAGE READING APPARATUS, IMAGE READING APPARATUS AND IMAGE FORMING APPARATUS

CROSS-REFERENCE TO RELATED APPLICATION

This invention is based on Japanese patent application No. 2006-320640 filed in Japan on Nov. 28, 2006, the entire content of which is hereby incorporated by reference.

BACKGROUND OF THE INVENTION

1. Field of the Invention

The present invention relates to an image reading apparatus which optically scans an original document to read an original image and a box used for making the image reading apparatus, and an image forming apparatus such as a copying machine comprising an image reading apparatus, facsimile machine comprising an image reading apparatus and the like and multifunctional machine produced by combining two or more of these.

2. Description of the Related Art

A typical example of image reading apparatuses which optically scan original documents to read the images of the original documents in use today is an image reading apparatus comprising a box and parts of the apparatus mounted on the box, the parts mounted on the box being at least a transparent table for supporting an original document, a first scanning unit which is disposed below the transparent table to illuminate the original document on the transparent table and reflect light reflected from the original document in an original document subscanning direction, a second scanning unit which reflects light reflected by the first scanning unit reversely in the subscanning direction, a drive mechanism which drives the first and second scanning units in the subscanning direction, a reading block having a photoelectric image pickup element and an optical system for leading reflected light coming from the second unit to the image pickup element to form an image, an image processor which processes image information from the image pickup element, and other components.

According to this type of image reading apparatus, the first and second scanning units are moved in the original document subscanning direction by the drive mechanism and simultaneously the original document mounted on the transparent plate for supporting an original document (normally a transparent glass plate) is optically scanned and light containing the image information reflected by the original document is led by the optical system in the reading block to the image pickup element having photoelectric conversion capability to form an image.

The image information read by the image pickup element is subjected to necessary processes by the image processor or other components, and is outputted from the image processor.

This type of imaging reading apparatuses which can be provided with an automatic document feeder sometimes also comprise a transparent plate for scanning a moving original document. In such an image reading apparatus, the original document can be fed out from an automatic document feeder while being passed over the transparent table, and the image of the document can be read by the first and second scanning units positioned in predetermined positions for reading the original document on the transparent plate for scanning a moving original document.

Such an image reading apparatus is used, for example, as a part of copying machines, and a part of multifunctional machines which combines the functions of a copying machine and a facsimile machine, or is used singly, for example, in such a manner that it is connected to a personal computer, or connected to a printer via a computer.

The image information outputted from the image processor is provided for formation of an copied image of the original document, transmission of the original image information to a recipient's facsimile machine, displaying of the image on an computer display, printing of the image by a printer, and for other purposes.

Size reduction and more compact designs are required for information appliances including image reading apparatuses today. Furthermore, universally designed image reading apparatuses which allow, for example, easy operation for physically handicapped people while being seated in wheelchairs are required.

Image reading apparatuses need to be improved and made thinner to fulfill these requests.

Figure 8:
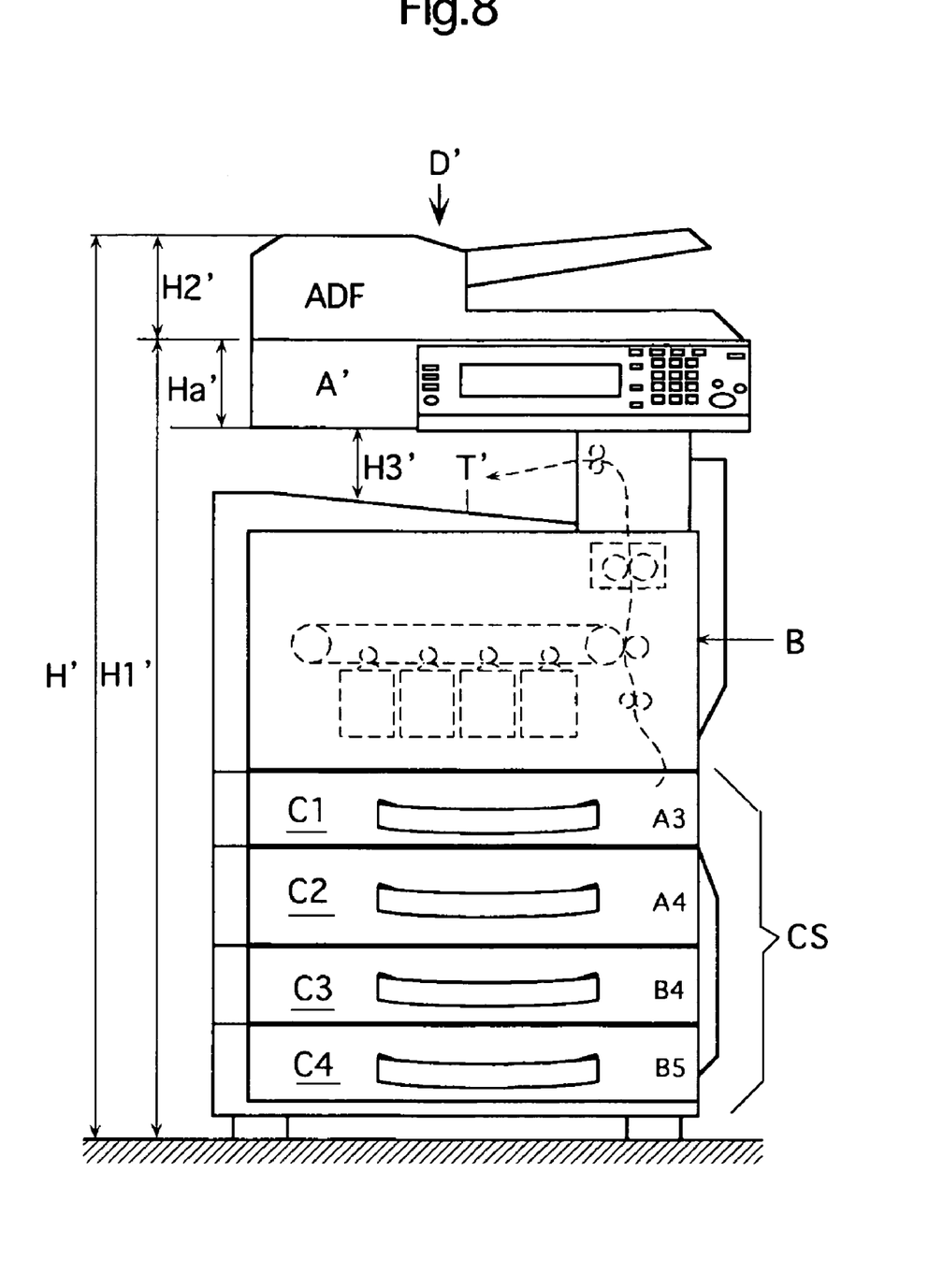
FIG. 8 is a front view of an example of an image forming apparatus for explaining the reason why a reduction in the thickness of the image reading apparatus is required.

FIG. 8 shows a copying machine as an example. This copying machine D' comprises an image forming portion B and an image reading apparatus A' thereabove, and also comprises a plurality of cassettes $\overline{C1}$ to C4 below the image forming portion B for containing recording mediums (for example, recording paper) with different sizes (A4 size, etc.) and an automatic document feeder ADF which is mounted on the image reading apparatus A' and also serves as an openable and closable document cover. A tray portion T' onto which a recording medium having an image formed thereon is discharged is formed between the image forming portion B and the image reading apparatus A'.

Taking this copying machine D' as an example, one of the reasons why reduction of the thickness of the image reading apparatus A' is required will be described.

The overall height H' of the copying machine D' is the sum of the height H2' of the automatic document feeder ADF and the height H1' of the image reading apparatus A', image forming portion B and a portion CS including the cassettes C1-C4. The height of a recording medium discharge space above the tray portion T' is H3' in a portion thereof.

To meet the current demand for enhanced speed of image formation in copying machines of this type, that is, to increase the number of sheets of image formation per unit time, enhanced speed of image formation in the image forming portion B and of image reading in the image reading apparatus A' must be of course achieved, but to make high-speed image formation more meaningful, it is also required to increase the recording medium capacity of the cassettes for accommodating recording mediums and increase the height H3' of the recording medium discharge space above the tray portion T'. To meet such requirements, the height of the portion CS in which cassettes are placed needs to be increased to increase the recording medium capacity, and/or the height H3' of the space needs to be increased to increase the capacity of recording mediums on which images are formed.

Such modifications, however, increase the overall size of the copying machine. In addition, a raise in the height positions of the image reading apparatus A' and automatic document feeder ADF lowers their ease of operation, whereby the apparatus is no longer compliant with universal designs.

Therefore, in addition to increasing the recording medium capacities of the cassettes and increasing the height H3' of the recording medium discharge space above the tray portion, in order to inhibit a raise in the height positions of the image reading apparatus A' and automatic document feeder ADF or to lower their positions, the height Ha' of the image reading apparatus A' in the vertical direction must be low and the apparatus $\overline{A'}$ must be made thinner.

Even in case where a recording medium discharge tray is not positioned between the image forming portion B and the image reading apparatus A' but is provided in a protruding manner on the image forming portion B or a sorter or other components are additionally provided on the image forming portion B onto which recording mediums are discharged, increasing the height of the portion in which the cassettes are placed to increase the recording medium capacities of the cassettes in response to enhanced speed lowers the ease of operation because of the raise in the height positions of the image reading apparatus A' and automatic document feeder ADF accordingly, whereby the apparatus is no longer compliant with universal designs.

Even when the image reading apparatus is used, for example, placed on a base such as a desk and connected to a computer, it is desirable that the image reading apparatus is made less bulky to facilitate installment and its height is reduced to comply with universal designs. A reduction in the thickness of the image reading apparatus is required also from such a perspective.

Regarding this point, for example, in Japanese Unexamined Patent Publication No. H11-69104, it is described that an image reading apparatus comprising a scanning means which moves approximately horizontally to scan an original document, an image reading means which carries out photoelectric conversion in response to the light reflected from the original document obtained by scanning by the scanning means, and an image processing means, an amplifier circuit, an A/D converter circuit, correction circuit and others which conducts a necessary processing on the image information from the image reading means, wherein part of the image processing means is positioned in a region above the lowermost end of the scanning means so as to avoid collision with the scanning means, and is positioned in a region below the optical path of the reflected light incident on the image reading means.

This publication describes that according to this image reading apparatus, the space necessary for the scanning means and image reading means and the space necessary for the image processing means overlap from the lowermost end of the scanning means to the optical path of the reflected light incident on the image reading means, whereby the thickness of the image reading apparatus can be reduced.

By the way, a box used for the image reading apparatus for mounting the scanning means and the like normally has a basic structure in which a base plate is attached to a rectangular frame, but sufficient strength of the box cannot be afforded only by such a basic structure. Therefore, it is recommended that a reinforcing member is arranged in and fixed to a box body having a structure in which a base plate is attached on a rectangular frame.

However, when such a reinforcing member is employed, a new measure will be necessary in correspondence with the employment of the reinforcing member to reduce the thickness of the image reading apparatus.

The image processing means described in Japanese Unexamined Patent Publication No. H11-69104 includes an A/D converter circuit which converts an analog signal received from the image reading means into a digital signal, but, instead of the A/D converter circuit included in the image processing means, an A/D conversion board mounted on an additional circuit board may be possibly employed as the A/D converter circuit.

When such an A/D conversion board is employed, a new measure will be necessary in correspondence with the employment of the A/D conversion board to reduce the thickness of the image reading apparatus.

When the distance between the image pickup element and the image processor including the A/D converter circuit is too large, the distance between the image pickup element and the A/D conversion board is too large, or the distance between the A/D conversion board and the image processor not including the A/D converter circuit is too large, an electromagnetic noise which is a radio wave transmitted to the surroundings is generated, or contrarily the image signal is affected by an electromagnetic noise. This problem occurs especially noticeably in high-speed machines. To solve such problems, an expensive and bulky shielded line needs to be routed in the box, but reduced thickness of the image reading apparatus makes of the routing of the shielded line difficult.

SUMMARY OF THE INVENTION

Accordingly, objects of the present invention are as follows on the premise of an image reading apparatus which comprises a box and component parts of the apparatus mounted on the box, the box comprising a box body and a reinforcing member, the box body comprising a rectangular frame and a base plate fixed on the rectangular frame, the reinforcing member being disposed in the box body and fixed to the box body, the component parts mounted on the box being at least a transparent plate for supporting an original document, a first scanning unit disposed below the transparent plate to illuminate the original document on the transparent plate and reflect light reflected from the original document in an original document subscanning direction, a second scanning unit which reflects light reflected from the first scanning unit in turn reversely in the subscanning direction, a drive mechanism which drives the first and second scanning units in the subscanning direction, a reading block having a photoelectric image pickup element and an optical system which leads light reflected from the second scanning unit to the image pickup element to form an image, an A/D conversion board which converts an analog signal received from the image pickup element into a digital signal, and an image processing unit which carries out image processing based on the digital signal received from the A/D conversion board.

A first object of the present invention is to provide a box used for making an image reading apparatus which can retain required strength and reduce thickness of the image reading apparatus with generation of electromagnetic noise and image noise suppressed.

A second object of the present invention is to provide an image reading apparatus which does not adversely affect strength of a box used for making the image reading apparatus and can reduce thickness of the image reading apparatus with generation of electromagnetic noise and image noise suppressed.

A third object of the present invention is to provide an image forming apparatus comprising an image reading apparatus which can be reduced in thickness without adversely affecting strength of a box used for making the image reading apparatus and with generation of electromagnetic noise and image noise suppressed, and can be set in a height position that allows easy operation.

To achieve the first object, in one aspect, the present invention provides first and second boxes for an image reading apparatus described below.

<First Box for an Image Reading Apparatus>

A box for an image reading apparatus, the box comprising a box body and a plate member, the box body comprising a rectangular frame and a base plate fixed on the rectangular frame, the plate member being disposed in the box body and fixed to the box body, the image reading apparatus comprising the box and component parts of the apparatus mounted on the box, the component parts being at least a transparent plate for supporting an original document, a first scanning unit disposed below the transparent plate to illuminate the original document on the transparent plate and reflect light reflected from the original document in an original document subscanning direction, a second scanning unit which reflects light reflected from the first scanning unit in turn reversely in the subscanning direction, a drive mechanism which drives the first and second scanning units in the subscanning direction, a reading block having a photoelectric image pickup element and an optical system which leads light reflected from the second scanning unit to the image pickup element to form an image, an A/D conversion board which converts an analog signal received from the image pickup element into a digital signal, and an image processing unit which carries out image processing based on the digital signal received from the A/D conversion board, wherein the plate member extends from an intermediate position in the subscanning direction of the box body toward one end side of the box body in the subscanning direction and has a dented area for placing the reading block without interfering with movement of the first scanning unit and a cutout portion formed from the dented area toward the one end side of the box body, the cutout portion being for disposing at least the image processing unit in such a state that the A/D conversion board is disposed between the reading block placed in the dented area and the image processing unit.

<Second Box for an Image Reading Apparatus>

A box for an image reading apparatus, the box comprising a box body and a reinforcing member, the box body comprising a rectangular frame and a base plate fixed on the rectangular frame, the reinforcing member being disposed in the box body and fixed to the box body, the image reading apparatus comprising the box and component parts of the apparatus mounted on the box, the component parts being at least a transparent plate for supporting an original document, a first scanning unit disposed below the transparent plate and comprising, mounted thereon, a lump for illuminating the original document on the transparent plate and a first mirror for reflecting light reflected from the original document in an original document subscanning direction, a second scanning unit comprising, mounted thereon, second and third mirrors which reflect light reflected from the first mirror in turn reversely in the subscanning direction, a drive mechanism which drives the first and second scanning units in the subscanning direction, a reading block having a photoelectric image pickup element and a lens which leads light reflected from the second scanning unit to the image pickup element to form an image, an A/D conversion board which converts an analog signal received from the image pickup element into a digital signal, and an image processing unit which carries out image processing based on the digital signal received from the A/D conversion board, wherein the reinforcing member is a reinforcing plate member extending from an intermediate position in the subscanning direction of the box body toward end-of-scan side which is one end side of the box body in the subscanning direction and having a downwardly drawn area for placing the reading block without interfering with movements of the first and second scanning units, upwardly drawn areas which are adjacent to the downwardly drawn area on front side and rear side and a cutout portion formed from the downwardly drawn area toward the end-of-scan side of the box body in the subscanning direction, and the cutout portion being for disposing at least the image processing unit in such a state that the A/D conversion board is disposed between the reading block placed in the downwardly drawn area and the image processing unit.

In another aspect, the present invention provides the following first and second image reading apparatuses to achieve the second object:

<First Image Reading Apparatus>

An image reading apparatus which comprises a box and component parts of the apparatus mounted on the box, the box comprising a box body and a plate member, the box body comprising a rectangular frame and a base plate fixed on the rectangular frame, the plate member being disposed in the box body and fixed to the box body, the component parts mounted on the box being at least a transparent plate for supporting an original document, a first scanning unit disposed below the transparent plate to illuminate the original document on the transparent plate and reflect light reflected from the original document in an original document subscanning direction, a second scanning unit which reflects light reflected from the first scanning unit in turn reversely in the subscanning direction, a drive mechanism which drives the first and second scanning units in the subscanning direction, a reading block having a photoelectric image pickup element and an optical system which leads light reflected from the second scanning unit to the image pickup element to form an image, an A/D conversion board which converts an analog signal received from the image pickup element into a digital signal, and an image processing unit which carries out image processing based on the digital signal received from the A/D conversion board, wherein the plate member of the box extends from an intermediate position in the subscanning direction of the box body toward one end side of the box body in the subscanning direction and has a dented area for placing the reading block without interfering with movement of the first scanning unit and a cutout portion formed from the dented area toward the one end side of the box body, and the reading block is mounted in the dented area of the plate member, and at least the image processing unit is disposed in the cutout portion of the plate member in such a state that the A/D conversion board is disposed between the reading block placed in the dented area and the image processing unit.

<Second Image Reading Apparatus>

An image reading apparatus which comprises a box and component parts of the apparatus mounted on the box, the box comprising a box body and a reinforcing member, the box body comprising a rectangular frame and a base plate fixed on the rectangular frame, the reinforcing member being disposed in the box body and fixed to the box body, the component parts mounted on the box being at least a transparent plate for supporting an original document, a first scanning unit disposed below the transparent plate and comprising, mounted thereon, a lump for illuminating the original document on the transparent plate and a first mirror for reflecting light reflected from the original document in an original document subscanning direction, a second scanning unit comprising, mounted thereon, second and third mirrors which reflect light reflected from the first mirror in turn reversely in the subscanning direction, a drive mechanism which drives the first and second scanning units in the subscanning direction, a reading block having a photoelectric image pickup element and a lens which leads light reflected from the second scanning unit to the image pickup element to form an image, an A/D conversion board which converts an analog signal received from the image pickup element into a digital signal, and an image processing unit which carries out image processing based on the digital signal received from the A/D conversion board, wherein the reinforcing member of the box is a reinforcing plate member extending from an intermediate position in the subscanning direction of the box body toward end-of-scan side which is one end side of the box body in the subscanning direction and having a downwardly drawn area for placing the reading block without interfering with movements of the first and second scanning units, upwardly drawn areas which are adjacent to the downwardly drawn area on front side and rear side and a cutout portion formed from the downwardly drawn area toward the end-of-scan side of the box body in the subscanning direction, and the reading block is mounted in the downwardly drawn area of the reinforcing plate, and at least the image processing unit is disposed in the cutout portion of the reinforcing plate in such a state that the A/D conversion board is disposed between the reading block placed in the downwardly drawn area and the image processing unit.

In another aspect, to achieve the third object, the present invention also provides an image forming apparatus comprising the above described image reading apparatus.

The foregoing and other objects, features, aspects and advantages of the present invention will become more apparent from the following detailed description when taken in conjunction with accompanying drawings.

DESCRIPTION OF THE PREFERRED EMBODIMENTS

Each of the first and second boxes described below can be mentioned as a box for an image reading apparatus of preferred embodiment of the invention.

<First Box for an Image Reading Apparatus>

A box used for an image reading apparatus, the box comprising a box body and a plate member, the box body comprising a rectangular frame and a base plate fixed on the rectangular frame, the plate member being disposed in the box body and fixed to the box body, the image reading apparatus comprising the box and component parts of the apparatus mounted on the box, the component parts being at least a transparent plate for supporting an original document, a first scanning unit disposed below the transparent plate to illuminate the original document on the transparent plate and reflect light reflected from the original document in an original document subscanning direction, a second scanning unit which reflects light reflected from the first scanning unit in turn reversely in the subscanning direction, a drive mechanism which drives the first and second scanning units in the subscanning direction, a reading block having a photoelectric image pickup element and an optical system which leads light reflected from the second scanning unit to the image pickup element to form an image, an A/D conversion board which converts an analog signal received from the image pickup element into a digital signal, and an image processing unit which carries out image processing based on the digital signal received from the A/D conversion board, wherein the plate member extends from an intermediate position in the subscanning direction of the box body toward one end side of the box body in the subscanning direction and has a dented area for placing the reading block without interfering with movement of the first scanning unit and a cutout portion formed from the dented area toward the one end side of the box body, the cutout portion being for disposing at least the image processing unit in such a state that the A/D conversion board is disposed between the reading block placed in the dented area and the image processing unit.

<Second Box for an Image Reading Apparatus>

A box used for an image reading apparatus, the box comprising a box body and a reinforcing member, the box body comprising a rectangular frame and a base plate fixed on the rectangular frame, the reinforcing member being disposed in the box body and fixed to the box body, the image reading apparatus comprising the box and component parts of the apparatus mounted on the box, the component parts being at least a transparent plate for supporting an original document, a first scanning unit disposed below the transparent plate and comprising, mounted thereon, a lump for illuminating the original document on the transparent plate and a first mirror for reflecting light reflected from the original document in an original document subscanning direction, a second scanning unit comprising, mounted thereon, second and third mirrors which reflect light reflected from the first mirror in turn reversely in the subscanning direction, a drive mechanism which drives the first and second scanning units in the subscanning direction, a reading block having a photoelectric image pickup element and a lens which leads light reflected from the second scanning unit to the image pickup element to form an image, an A/D conversion board which converts an analog signal received from the image pickup element into a digital signal, and an image processing unit which carries out image processing based on the digital signal received from the A/D conversion board, wherein the reinforcing member is a reinforcing plate member extending from an intermediate position in the subscanning direction of the box body toward end-of-scan side which is one end side of the box body in the subscanning direction and having a downwardly drawn area for placing the reading block without interfering with movements of the first and second scanning units, upwardly drawn areas which are adjacent to the downwardly drawn area on front side and rear side and a cutout portion formed from the downwardly drawn area toward the end-of-scan side of the box body in the subscanning direction, and the cutout portion being for disposing at least the image processing unit in such a state that the A/D conversion board is disposed between the reading block placed in the downwardly drawn area and the image processing unit.

According to the first and second boxes for image reading apparatuses, the reinforcing member of the box body is basically a plate member (reinforcing plate) comprising a plate body. Therefore, it does not prevent reduction in the thickness of the box, and thus reduction in the thickness of the image reading apparatus. In addition, in the plate member (reinforcing plate), the dented area (downwardly drawn area in the second box) for placing the reading block and one or more raised areas adjacent to the dented area (raised area(s) which are at least relatively formed by the formation of the dented area in the first box, and upwardly drawn areas in the second box) are formed. Therefore, the plate member can have the strength required as a reinforcing member, and thus can impart required strength to the box.

According to the first and second boxes mentioned above, the reading block can be placed with the height position of its upper end kept low by utilizing the dented area of the plate member (reinforcing plate).

Furthermore, the image processing unit can be disposed in the cutout portion of the plate member (reinforcing plate) in a state that the A/D conversion board is disposed between the unit and the reading block placed in the dented area (downwardly drawn area) to make the arrangement of the reading block, A/D conversion board and image processing unit compact. Therefore, the first and second scanning units can be disposed correspondingly closer to the base plate of the box. This can reduce the thickness of the image reading apparatus.

Since the arrangement of the reading block, A/D conversion board and image processing unit can be made compact to shorten the distances between the reading block and A/D conversion board and between the A/D conversion board and image processing unit, generation of electromagnetic noise and image noise can be suppressed correspondingly.

As mentioned above, according to the first and second boxes for an image reading apparatus, required strength can be retained and simultaneously the thickness of the image reading apparatus can be reduced while generation of electromagnetic noise and image noise can be suppressed.

A recess which faces the cutout portion of the plate member (reinforcing plate) for admitting a lower end portion of the A/D conversion board through the cutout portion may be formed on the base plate.

In the above-mentioned second box, an inverter unit supporting member for mounting an inverter unit for supplying at least the illumination lamp with electric power may be provided in a manner of projecting from the rear side of the box toward the outside of the box. The inverter unit supporting member can be preliminarily provided, and then the inverter unit can be mounted on this supporting member, whereby an influence of high heat radiated from the inverter unit which can deal with an increase in the quantity of light of the lamp to meet the demand for a increased rates of reading images on the image pickup element and other components can be suppressed so that generation of image noise can be suppressed.

It is also possible to mount the inverter unit and a cooling fan in the first scanning unit as in a known example. However, employing the cooling fan in the scanning unit results in generation of vibration and dust, which may lower the quality of the image reading apparatus.

Examples of image reading apparatuses according to preferred embodiments of the invention include the following first and second image reading apparatuses.

<First Image Reading Apparatus>

An image reading apparatus which comprises a box and component parts of the apparatus mounted on the box, the box comprising a box body and a plate member, the box body comprising a rectangular frame and a base plate fixed on the rectangular frame, the plate member being disposed in the box body and fixed to the box body, the component parts mounted on the box being at least a transparent plate for supporting an original document, a first scanning unit disposed below the transparent plate to illuminate the original document on the transparent plate and reflect light reflected from the original document in an original document subscanning direction, a second scanning unit which reflects light reflected from the first scanning unit in turn reversely in the subscanning direction, a drive mechanism which drives the first and second scanning units in the subscanning direction, a reading block having a photoelectric image pickup element and an optical system which leads light reflected from the second scanning unit to the image pickup element to form an image, an A/D conversion board which converts an analog signal received from the image pickup element into a digital signal, and an image processing unit which carries out image processing based on the digital signal received from the A/D conversion board, wherein the plate member of the box extends from an intermediate position in the subscanning direction of the box body toward one end side of the box body in the subscanning direction and has a dented area for placing the reading block without interfering with movement of the first scanning unit and a cutout portion formed from the dented area toward the one end side of the box body, and the reading block is mounted in the dented area of the plate member, and at least the image processing unit is disposed in the cutout portion of the plate member in such a state that the A/D conversion board is disposed between the reading block placed in the dented area and the image processing unit.

<Second Image Reading Apparatus>

An image reading apparatus which comprises a box and component parts of the apparatus mounted on the box, the box comprising a box body and a reinforcing member, the box body comprising a rectangular frame and a base plate fixed on the rectangular frame, the reinforcing member being disposed in the box body and fixed to the box body, the component parts mounted on the box being at least a transparent plate for supporting an original document, a first scanning unit disposed below the transparent plate and comprising, mounted thereon, a lump for illuminating the original document on the transparent plate and a first mirror for reflecting light reflected from the original document in an original document subscanning direction, a second scanning unit comprising, mounted thereon, second and third mirrors which reflect light reflected from the first mirror in turn reversely in the subscanning direction, a drive mechanism which drives the first and second scanning units in the subscanning direction, a reading block having a photoelectric image pickup element and a lens which leads light reflected from the second scanning unit to the image pickup element to form an image, an A/D conversion board which converts an analog signal received from the image pickup element into a digital signal, and an image processing unit which carries out image processing based on the digital signal received from the A/D conversion board, wherein the reinforcing member of the box is a reinforcing plate member extending from an intermediate position in the subscanning direction of the box body toward end-of-scan side which is one end side of the box body in the subscanning direction and having a downwardly drawn area for placing the reading block without interfering with movements of the first and second scanning units, upwardly drawn areas which are adjacent to the downwardly drawn area on front side and rear side and a cutout portion formed from the downwardly drawn area toward the end-of-scan side of the box body in the subscanning direction, and the reading block is mounted in the downwardly drawn area of the reinforcing plate, and at least the image processing unit is disposed in the cutout portion of the reinforcing plate in such a state that the A/D conversion board is disposed between the reading block placed in the downwardly drawn area and the image processing unit.

According to the first and second image reading apparatuses described above, the reinforcing member in the box is a plate member (reinforcing plate) basically consisting of a plate body. Therefore, it does not prevent reduction in thickness of the box and thus reduction in thickness of the image reading apparatus. In addition, on the plate member (reinforcing plate), the dented area (downwardly drawn area in the second image reading apparatus) for placing the reading block and one or more raised areas adjacent to the dented area (raised area(s) which are at least relatively formed by the formation of the dented area in the first image reading apparatus, upwardly drawn areas in the second image reading apparatus) are formed. Therefore, the plate member can have the strength required as a reinforcing member, and thus can impart required strength to the box.

According to the first and second image reading apparatuses mentioned above, the reading block can be placed with the height position of its upper end kept low by utilizing the dented area of the plate member (reinforcing plate).

Furthermore, the image processing unit can be disposed in the cutout portion of the plate member (reinforcing plate) in a state that the A/D conversion board is disposed between the unit and the reading block placed in the dented area (downwardly drawn area) to make the arrangement of the reading block, A/D conversion board and image processing unit compact. Therefore, the first and second scanning units can be disposed correspondingly closer to the base plate of the box. This can reduce the thickness of the entire image reading apparatus.

Since the arrangement of the reading block, A/D conversion board and image processing unit can be made compact to shorten the distances between the reading block and A/D conversion board and between the A/D conversion board and image processing unit, generation of electromagnetic noise and image noise can be suppressed correspondingly.

Hence, according to the first and second image reading apparatuses, the thickness of the image reading apparatus can be reduced while adverse effect on the strength of the box used is prevented and generation of electromagnetic noise and image noise is suppressed.

The following constitution may be employed to more securely achieve reduction in the thickness of the image reading apparatus.
(1) The image processing unit may be disposed in a height position in a range of vertical height of the A/D conversion board.
(2) The upper end (the uppermost end) of the A/D conversion board may be positioned in a height position lower than that of the upper end (the uppermost end) of the reading block.
(3) The A/D conversion board may be supported by an A/D conversion board supporting member, the image pickup element may be disposed in a manner of fitting into a cutout portion formed on the A/D conversion board supporting member to be attached to an upper part of the A/D conversion board, and the upper ends (the uppermost ends) of the image pickup element and A/D conversion board may be positioned in height positions lower than the height position of the upper end (the uppermost end) of the reading block.

In this case, the image reading apparatus can be made compact and the suppression of image noise can be achieved correspondingly by this constitution. The A/D conversion board supporting member can be attached to the dented area of the plate member (reinforcing plate), for example, with the reading block interposed therebetween or directly.
(4) When the optical system of the reading block may be a lens, the lens used may be one that is produced by cutting off upper and lower portions of a round lens to reduce the size in the height direction.
(5) When the lens of (4) mentioned above is employed, the upper end (the uppermost end) of the A/D conversion board may be positioned in a height position lower than the upper end face of the lens.
(6) When the lens of (4) mentioned above is employed, the image pickup element may be attached to an upper part of the A/D conversion board so that the upper ends (the uppermost ends) of the image pickup element and A/D conversion board are both positioned in height positions lower than the upper end face of the lens.

In any case, a dented portion facing the cutout portion of the plate member (reinforcing plate) may be formed on the base plate of the box so that the lower end portion of the A/D conversion board is inserted into the dented portion through the cutout portion of the plate member (reinforcing plate).

When the optical system comprises a lens, in order to suppress the incidence of noise light on the image pickup element and thus suppress generation of image noise, the reading block may comprise a light-blocking cover which covers at least a portion of lens barrel holding the lens, extends from the lens barrel to the image pickup element and covers the image pickup element, and the upper end (the uppermost end) of the light-blocking cover may be positioned in the same height position as the upper end (the uppermost end) of the lens barrel or a height position lower than the upper end of the lens barrel.

In this case, a stepped portion which is sunken into the lens barrel may be formed at an end portion on light-blocking cover side of the lens barrel so that the lens barrel side end portion of the light-blocking cover is fitted onto the stepped portion.

In any case, in order to simplify the front side of the image reading apparatus to facilitate the operation of the apparatus and minimize the routing of a harness in the box so that reduction in the thickness of the image reading apparatus is not prevented, an interface connector may be provided on the image processing unit at an end portion thereof [for example, an end portion on scanning end side (end-of-scan side)] in the subscanning direction so that a corresponding external connector is attachable to and detachable from the interface connector from the outside of the end portion in the subscanning direction of the box.

In such a case, when the drive mechanism of the first and second scanning units comprise a rotation shaft extending in a main scanning direction of the original document at an end portion in the subscanning direction of the box, the interface connector of the image processing unit may be positioned in a position lower than the rotation shaft.

To suppress generation of electromagnetic noise and image noise, a shielding cover covering the A/D conversion board, the image processing unit and a harness which connects the A/D conversion board and image processing unit may be provided. The shielding cover may be such that covers the image pickup element.

In case where such a shielding cover is provided, when the drive mechanism of the first and second scanning units comprise a rotation shaft extending in the main scanning direction at an end portion [for example, an end portion on scanning end side (end-of-scan side)] in the subscanning direction of the box, an end portion of the shielding cover in the subscanning direction may be caused to face the rotation shaft from below so that it does not come into contact with the rotation shaft.

In case of the above second image reading apparatus, an inverter unit supporting member may be provided on the rear side of the box in a manner of projecting toward the outside of the box, and an inverter unit which supplies at least the illumination lamp with electric power may be mounted on the inverter unit supporting member.

The inverter unit supporting member may be preliminarily provided and then the inverter unit may be mounted on this supporting member, whereby the influence of high heat radiated from the inverter unit which can deal with an increase in the quantity of light of the lamp required by an increased rate of reading images (high-speed image reading) on the image pickup element and other components can be suppressed and thus generation of image noise can be suppressed.

At least one of a junction board for supplying power to the image reading apparatus, a junction board for inputting a control signal and a cooling fan may be further mounted on the inverter unit supporting member.

The image reading apparatus described above may be, for example, a single image reading apparatus which is used by being connected to a computer, or may be one that is used as a component of an image forming apparatus.

An example of the image forming apparatuses of preferred embodiments of the present invention include an image forming apparatus comprising any of the above-mentioned image reading apparatuses.

The term "image forming apparatus" herein denotes a copying machine, a multifunctional machine which functions as a copying machine and further functions as a facsimile machine and (or) a printer, or the like.

Since this image forming apparatus comprises an image reading apparatus whose thickness can be reduced, the image reading apparatus can be set in such a height position that allows easy operation thereof.

Specific examples of the box for an image reading apparatus, image reading apparatus and image forming apparatus will be described below with reference to drawings.

Figure 1:
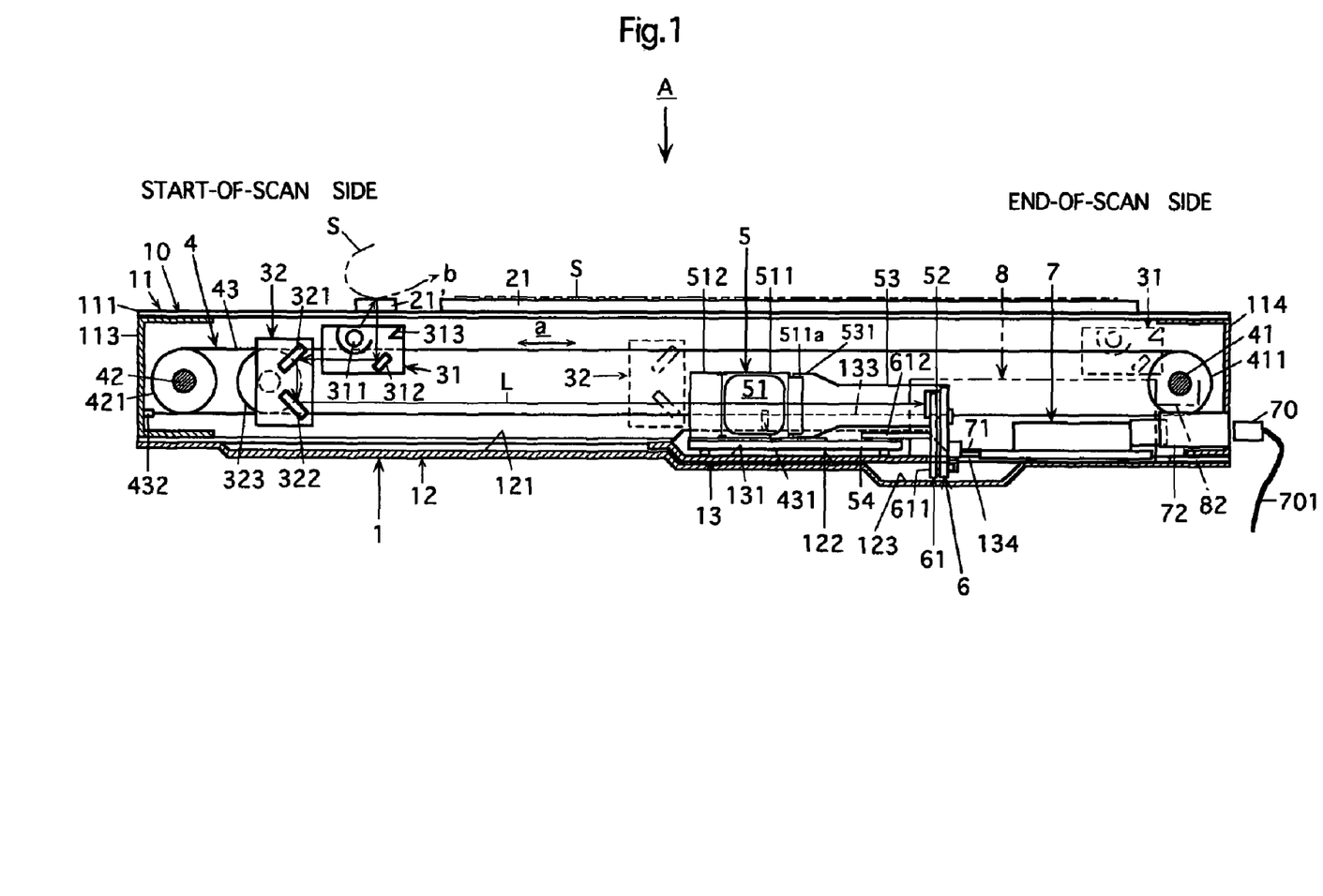
FIG. 1 is a partly sectioned view of main parts of an example of an image reading apparatus seen from front side.

FIG. 1 shows an image reading apparatus A using an example of a box for an image reading apparatus. FIG. 1 is a partly sectioned view of the main parts of the apparatus A seen from the front.

The image reading apparatus A comprises the following parts mounted on a box 1: a transparent glass plate 21 for supporting an original document and a transparent glass plate 21' for scanning a moving original document, a first scanning unit 31 and a second scanning unit 32 disposed below the transparent glass plates 21, 21', a drive mechanism 4 which drives the first and second scanning units 31, 32 in the original document subscanning direction a, a reading block 5 having a photoelectric conversion image pickup element 52 and an optical system 51, an A/D conversion board 6, an image processing unit 7 and other components.

The terms "original document subscanning direction" and "subscanning direction" denote the subscanning direction of the original document, which is the horizontal direction in the illustrated image reading apparatus A. The terms "main scanning direction of the original document" and "main scanning direction" denote the main scanning direction of the original document perpendicular to the subscanning direction, which is the direction from the front side to the rear side, or from the rear side to the front side of the image reading apparatus A in the illustrated image reading apparatus A.

Figure 2:
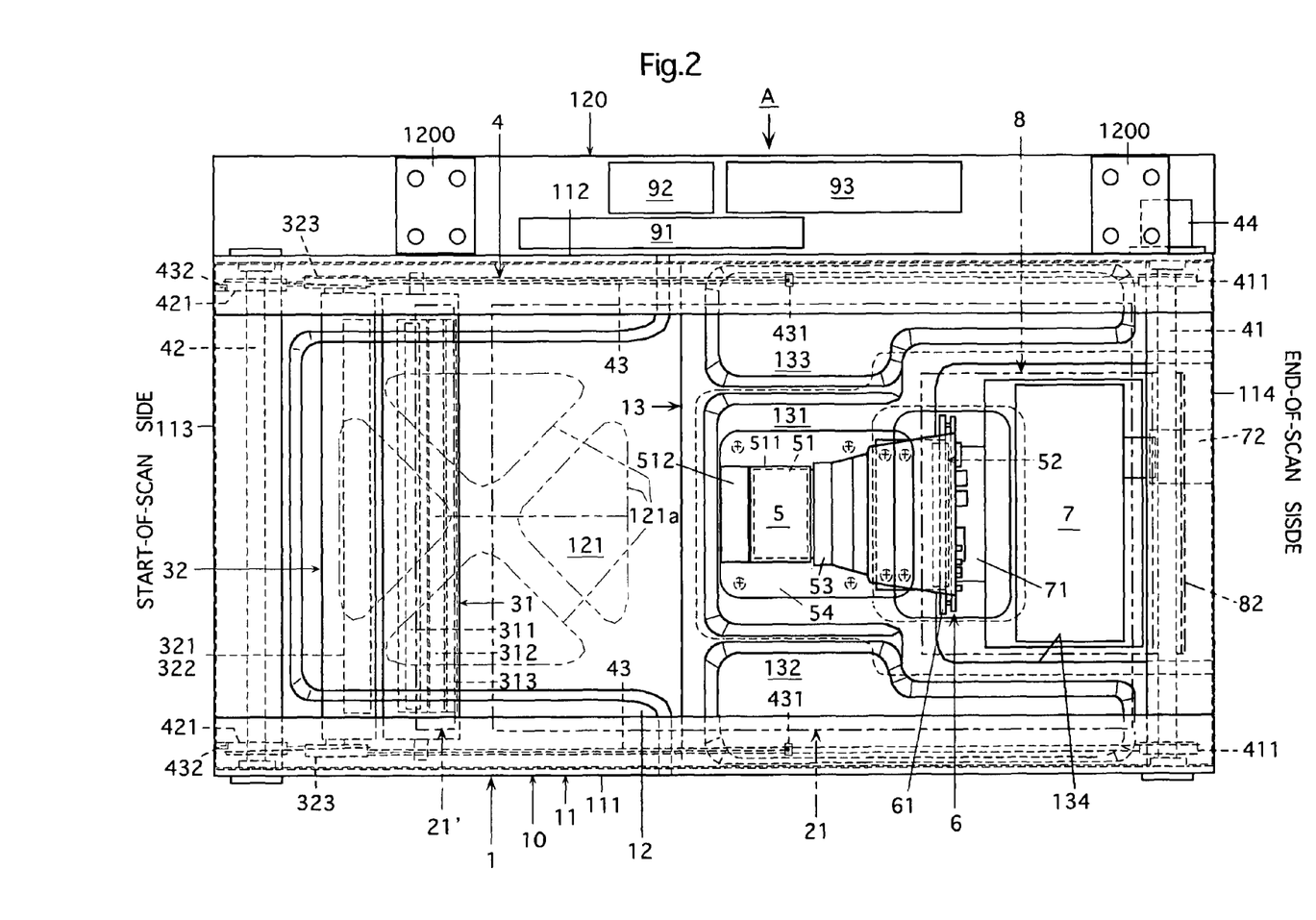
FIG. 2 is a plan view of the image reading apparatus shown in FIG. 1.

As shown in FIG. 2, the box 1 comprises a box body 10 and a reinforcing plate 13. The box body 10 comprises a base plate 12 and a rectangular frame 11 which has a rectangular shape when seen from the upper side. The base plate 12 is attached and fixed to the rectangular frame 11. The reinforcing plate 13 is disposed inside the box body 10 along the base plate 12, and is attached and fixed to the box body 10.

The frame 11 is formed of groove-shaped members 111, 112 positioned on the front side and rear side of the image reading apparatus A, respectively, and extending in the subscanning direction a and groove-shaped members 113, 114 which connect the horizontal ends of the two groove-shaped members 111, 112 and extend in the main scanning direction.

Figure 3:
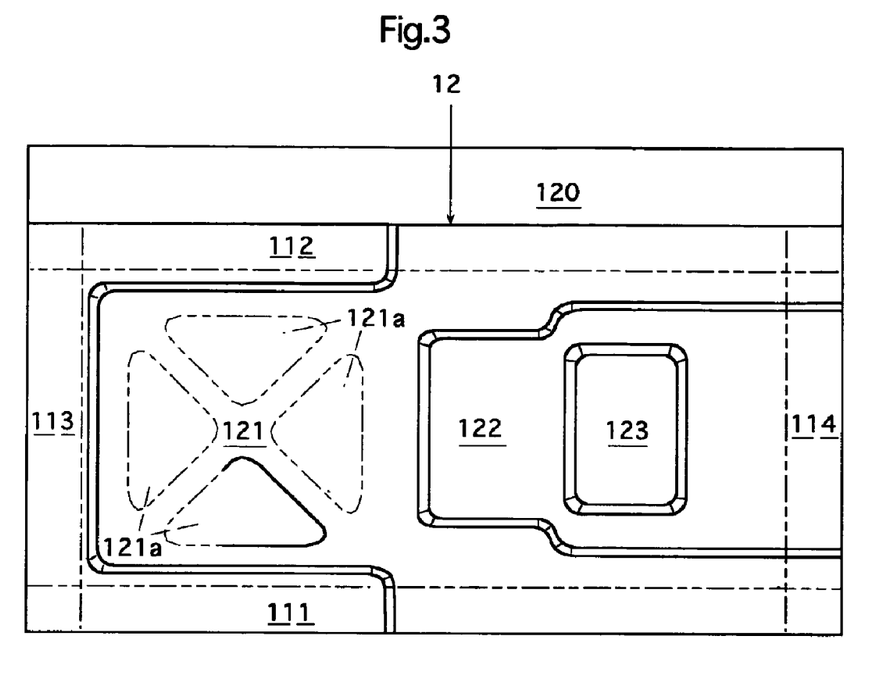
FIG. 3 is a plan view of a base plate of a box in the image reading apparatus in FIG. 1.

FIG. 3 is a plan view of the base plate 12. In FIG. 3, the positions of the groove-shaped members 111 to 114 which constitute the box body are indicated by chain lines.

As shown in FIGS. 2 and 3, the base plate 12 has a first downwardly drawn area 121 produced by slightly drawing the plate body downwardly and a second downwardly drawn area 122 produced by further slightly drawing the dented area 121 downwardly, and a dented portion 123 for admitting the lower end portion of the A/D conversion board 6 as described later is further formed by downwardly drawing the downwardly drawn area 122. The base plate 12 has a strength required for a base plate in these drawing processes.

In order to improve the strength of the base plate, for example, a plurality of triangular upwardly drawn areas or downwardly drawn areas 121a as indicated by chain lines in FIGS. 2 and 3 may be formed in the downwardly drawn area 121 of the base plate 12.

A plate 120 for supporting an inverter unit 91 described later is integrally formed on the base plate 12 in a projecting manner. The supporting plate 120 protrudes outwardly on the rear side of the box 1.

As shown in FIG. 2, the reinforcing plate 13 extends from an intermediate portion in the subscanning direction a of the box body 10 to the end portion on the end-of-scan side of the box body 10, and extends to the end portions of the box body 10 on the front side and rear side in the main scanning direction. Most of the reinforcing plate 13 is located above the base plate 12, and is fixed to the box body 10 by screws (not shown) and other fasteners.

Figure 4:
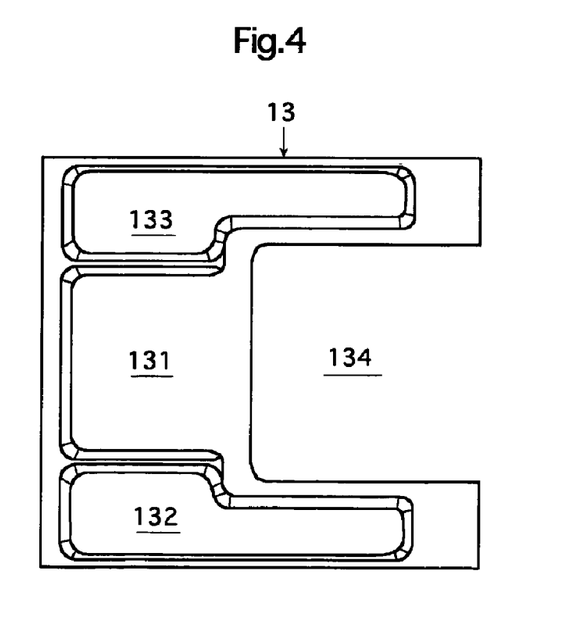
FIG. 4 is a plan view of a reinforcing plate of the box in the image reading apparatus in FIG. 1.

FIG. 4 is a plan view of the reinforcing plate 13.

The reinforcing plate 13 has a downwardly drawn area 131 for placing the reading block 5, and has upwardly drawn areas 132, 133 on the front side and rear side adjacent to the downwardly drawn area 131. The reinforcing plate 13 further has a cutout portion 134 formed from the downwardly drawn area 131 toward the scanning end position side.

As shown in FIGS. 1 and 2, the downwardly drawn area 131 for placing the reading block of the reinforcing plate 13 is fitted onto the second downwardly drawn area 122 of the base plate 12, and the dented portion 123 of the base plate 12 faces the cutout portion 134 of the reinforcing plate 13.

The glass plates 21, 21' are disposed in an upper end portion of the box 1 and slightly spaced from each other in the subscanning direction a, and are fixed by members not illustrated. In FIG. 2, the glass plates 21, 21' are indicated by chain lines. The glass plate 21 has a large area so that an original document S can be placed on it, but the glass plate 21' is in the shape of a strip extending in the main scanning direction.

The first scanning unit 31 has, mounted thereon, a lamp 311 which illuminates the original document S on the transparent glass plate 21 or 21' and a first mirror 312 which reflects the light reflected from the original document S toward the left side (the start-of-scan side of the original document) in FIG. 1 in the subscanning direction a of the original document S, and an auxiliary reflection member 313 which directs the light of the lamp to the original document S.

The second scanning unit 32 has, mounted thereon, second and third mirrors 321, 322 which reflect light reflected from the first mirror 312 of the scanning unit 31 in turn toward the right side in FIG. 1 (toward the end-of-scan side shown in FIG. 1) in the subscanning direction a.

A pulley 323 constituting a portion of a scanning unit drive mechanism 4 described later is rotatably supported in each of front and rear side portions of the unit 32.

Each of the first, second scanning units 31, 32 can be moved in the subscanning direction a by a guide mechanism (not shown) (for example, a guide member placed in each of the groove-shaped members 111, 112 on the front side and rear side of the box 1 and rollers on the scanning unit which roll along these guide members) provided correspondingly to each scanning unit.

The drive mechanism 4 comprises a pair of drive pulleys 411 on a drive shaft 41 which are positioned within the end portion of the box 1 on the end-of-scan side and rotatably supported on the box 1, a pair of driven pulleys 421 on a shaft 42 which are positioned in the end portion of the box 1 on the start-of-scan side and rotatably supported by the box 1, and a pair of pulleys 323 on the second scanning unit 32.

On the front side of the image reading apparatus A, a wire 43 whose one end is connected to a wire connection portion 431 on the reinforcing plate 13 is wound around the pulley 323 on the second scanning unit 32 from bottom to top to be led to the drive pulley 411, wound around the pulley 411 from top to bottom to be led to the driven pulley 421, wound around the pulley 421 from bottom to top to be led to the pulley 323 on the second scanning unit 32, and then wound around the pulley from top to bottom to be connected to a wire connection portion 432 in the groove-shaped member 113 at the left end of the box 1.

The other wire 43 is wound around the drive pulley 411, driven pulley 421 and pulley 323 on the scanning unit 32 also on the rear side of the image reading apparatus A. The drive shaft 41 is driven by a motor 44 which can be forwardly and reversely rotated.

The first scanning unit 31 is connected to each wire 43 on the front side and rear side.

According to this drive mechanism 4, the first scanning unit 31 and second scanning unit 32 can be moved from the start-of-scan position of the original document S on the glass plate 21 to the end-of-scan position in the subscanning direction a in such a manner that the second scanning unit 32 can be moved at a speed ½ of the first scanning unit 31 and the length of an optical path L from the original document to an image pickup element 52 of the reading block 5 described later can be maintained constant by rotating the drive pulleys 411 with the motor 44. This also allows the scanning units to be returned to the initial positions after scanning of the original document is completed.

When an image is read in the moving document scan mode by using an automatic document feeder, the first and second scanning units 31, 32 may be disposed in predetermined positions (the positions indicated by the solid lines in FIG. 1) for reading the original document S transferred along the transparent glass plate 21' for scanning a moving document.

The photoelectric conversion image pickup element 52 constituting the reading block 5 herein is a so-called line sensor produced by arranging charge coupled devices (CCD).

The optical system 51 constituting the reading block used herein is a lens 51 comprising a plurality of lenses. In the lens 51, to reduce the thickness of the image reading apparatus A, upper and lower portions of the set of lenses comprising a plurality of lenses arranged in the shape of a circle as a whole are cut off and removed along a plane including the main scanning direction and subscanning direction a to reduce height of the lens 51 in the vertical direction.

The reading block 5 comprises, in addition to the above lens 51, a lens barrel 511 retaining this lens 51, a cylindrical light-blocking member 512 connected to the front of the lens barrel 511 and the above-mentioned line sensor 52, and further a light-blocking cover 53 covering from the lens barrel 511 to the line sensor 52.

The light-blocking cover 53 is drawn in the vertical direction and the main scanning direction in its course and reaches a position covering the line sensor 52. The cover 53 is for suppressing image noise generated when light comes into the line sensor 52 from portions other than the second scanning unit 32.

As shown in FIG. 1, in this example, a stepped portion 511a which is sunken into the barrel is formed at the line sensor side edge of the lens barrel 511, and the lens barrel side edge 531 of the light-blocking cover 53 is fitted onto this stepped portion 511a.

The outlines of the outer peripheries of the lens barrel 511, light-blocking member 512 and the lens barrel side edge of the light-blocking cover 53 are approximately the same as the outline of the outer periphery of the lens 51, whereby the height dimension of the reading block 5 is kept low. This contributes to the reduction in the thickness of the image reading apparatus A.

In the reading block 5, the upper end (the uppermost end) of the lens barrel 511 is the upper end (the uppermost end) of the reading block 5. The upper end (the uppermost end) of the light-blocking cover 53 is in a position as high as or lower than the upper end of the lens barrel.

The reading block 5 is attached and fixed onto a supporting plate 54, and the supporting plate 54 is attached and fixed to the downwardly drawn area 131 of the reinforcing plate 13 of the box 1, whereby the reading block 5 is placed in the downwardly drawn area 131. Thus, the reflected light containing the image information received from the second scanning unit 32 can be led to the line sensor 52 to form an image by the lens 51.

The A/D conversion board 6 is a component which converts an analog signal outputted from the line sensor 52 into a digital signal, and is disposed behind the reading block 5 (on the scanning end position side).

The A/D conversion board 6 is attached and fixed to the supporting member 61, and the supporting member 61 is attached and fixed to the supporting plate 54 for the reading block 5, whereby the A/D conversion board 6 is indirectly fixed to the downwardly drawn area 131 of the reinforcing plate 13. The lower end portion of the A/D conversion board 6 and the lower end portion of the supporting member 61 are inserted into the dented portion 123 of the base plate 12 of the box 1 from the cutout portion 134 of the reinforcing plate 13.

Figure 5:
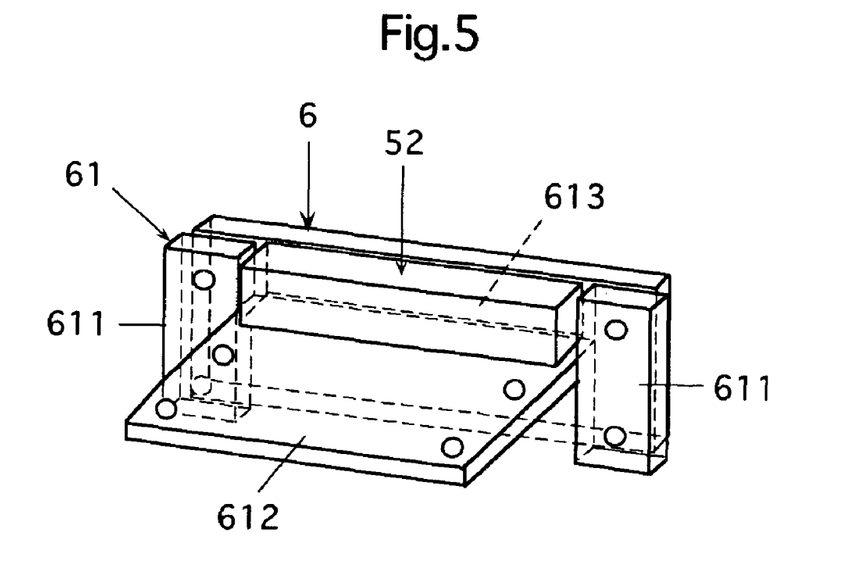
FIG. 5 is a perspective view of a line sensor and an A/D conversion board and a supporting member of the board.

As shown in FIG. 5, the supporting member 61 for the A/D conversion board 6 has a pair of portions 611 to which the A/D conversion board 6 is fixed and which extend in the vertical direction, and a shelf portion 612 protruding from the course of the pair of the portions 611, and the shelf portion 612 is fixed to the supporting plate 54 for the reading block 5. A cutout portion 613 is provided between the portions 611 and above the shelf portion 612, and the line sensor 52 is fitted into the cutout portion to be attached to an upper end portion of the A/D conversion board 6.

The image processing unit 7 comprises an image processing board and other components, is connected to the A/D conversion board 6 by a short harness 71, and subjects an image signal outputted from the board 6 to a necessary process.

The image processing unit 7 is disposed behind the A/D conversion board 6 in a height position within the range of the vertical height of the board 6, and is positioned in the cutout portion 134 of the reinforcing plate 13 of the box 1 to be attached and fixed to the base plate 12.

In the above-described state that the reading block 5, A/D conversion board 6 and image processing unit 7 are installed, both the upper end of the line sensor 52 and the upper end of the A/D conversion board 6 are in positions lower than the upper end of the reading block 5 (the upper end of the lens barrel 511 in this example), and are herein further in positions lower than the upper end face of the lens 51.

In such a manner, the reading block 5, A/D conversion board 6 and image processing unit 7 are all in the positions which do not interfere with the movements of the first and second scanning units 31, 32. All of these are in positions lower than the moving range of the first scanning unit 31, and the reading block 5 is in a position which is closer to the end portion of the box 1 on the end-of-scan side than the second scanning unit 32 when the second scanning unit 32 moves to the position closest to the end portion of the box 1 on the end-of-scan side (position indicated by the chain line in FIG. 1).

The image processing unit 7 has an interface connector 72 at its end-of-scan side end. The interface connector 72 is positioned in a position lower than the drive shaft 41 of the scanning unit drive mechanism 4 on the end-of-scan side and a corresponding external connector 70 can be attached to and detached from the connector 72 from the outside of the end-of-scan side end of the box 1.

The corresponding external connector 70 can provide an image signal outputted from the image processing unit 7, for example, to an image forming portion B of an image forming apparatus D described later with reference to FIG. 7 via the shielded harness 701 connected thereto to subject the signal to image formation in the image forming portion B.

Figure 6:
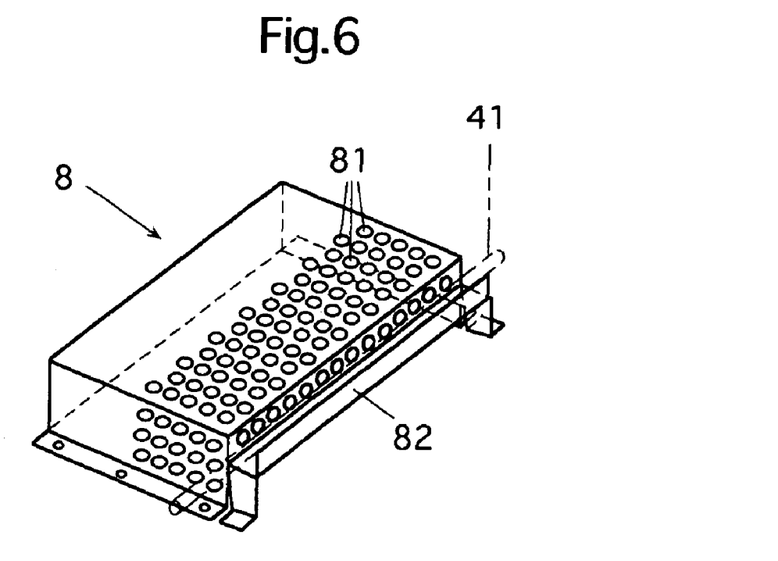
FIG. 6 is a perspective view of a shielding cover.

The image reading apparatus A also comprises, in addition to those mentioned above, a shielding cover 8 (illustrated by the chain line in FIGS. 1 and 2) covering the line sensor 52, the A/D conversion board 6, the image processing unit 7, and the harness 71 which connects the board 6 and unit 7. As shown in FIG. 6, the shielding cover 8 is in the shape of a box, and has a number of holes 81 for radiating heat formed in a portion covering the image processing unit 7 which generates a large amount of heat.

The shielding cover 8 has such a height that does not interfere with the movement of the first scanning unit 31, and is disposed in the cutout portion 134 of the reinforcing plate 13 to be attached to the base plate 12. The end-of-scan side end 82 of the shielding cover 8 is in the shape of a groove so that it does not come into contact with the drive shaft 41 of the scanning unit drive mechanism 4, and faces the drive shaft 41 from below.

As shown in FIG. 2, on the inverter supporting plate 120 projecting to the outside on the rear side of the box 1, in addition to the inverter unit 91 which supplies electric power to the lamp 311 on the first scanning unit 31, a junction board 92 for supplying electric power from the image forming portion B and/or other components of the image forming apparatus D described later with reference to FIG. 7 to the image reading apparatus A and a junction board 93 for transmitting a control signal from the image forming portion B and/or other components to the image reading apparatus A are also mounted. A cooling fan may be also mounted. The motor 44 of the scanning unit drive mechanism 4 is also mounted on this supporting plate 120.

According to the image reading apparatus A described above, the image of the original document S placed on the glass plate 21 can be scanned by moving the first and second scanning units 31, 32 by the scanning unit drive mechanism 4 in the subscanning direction so that an image is formed on and read by the line sensor 52. It is also possible to read the image of the original document S by moving the original document S along the glass plate 21' while the scanning units 31, 32 remain in the predetermined positions indicated by the solid lines in FIG. 1.

According to the image reading apparatus A and the box 1 used therefor, since the reinforcing member in the box 1 is the reinforcing plate 13 basically consisting of a plate body, reduction in the thickness of the box 1 and thus reduction in the thickness of the entire image reading apparatus A are not prevented. In addition, the downwardly drawn area 131 for placing the reading block 5 and the upwardly drawn areas 132, 133 which are adjacent to the downwardly drawn area 131 on the front side and rear side are formed on the reinforcing plate 13. Therefore, the reinforcing plate 13 can have the strength required as a reinforcing member, which imparts required strength to the box 1 and further to the image reading apparatus A.

The reading block 5 is installed by utilizing the downwardly drawn area 131 of the reinforcing plate 13 of the box in its downwardly drawn area 131 and is placed with the height position of its upper end (the uppermost end) being low. Furthermore, the reading block 5 itself employs the lens 51 whose upper and lower portions have been cut off to reduce its vertical height and is accordingly formed to have a low height as a whole. Moreover, the upper end of the A/D conversion board 6 and the upper end of the line sensor 52 are in height positions lower than the upper end of the reading block 5 (and further the upper end face of the lens 51).

In a state that the A/D conversion board 6 is disposed between the unit 7 and the reading block 5 placed in the downwardly drawn area 131 of the reinforcing plate 13 and the arrangement of the reading block 5, A/D conversion board 6 and image processing unit 7 is thus made compact, the image processing unit 7 is disposed in a height position within the range of the vertical height of the board 6, and is disposed in the cutout portion 134 of the reinforcing plate 13. Therefore, the first and second scanning units 31, 32 can be disposed closer to the base plate 12 of the box accordingly. These reduce the thickness of the entire image reading apparatus.

Since the arrangement of the reading block 5, A/D conversion board 6 and image processing unit 7 is made compact, the line sensor 52 of the reading block 5 is mounted on the A/D conversion board 6 and the distance between the A/D conversion board 6 and image processing unit 7 is short, generation of electromagnetic noise and image noise can be suppressed correspondingly.

Since the line sensor 52, the A/D conversion board 6, the image processing unit 7, the harness 71 which connects the board 6 and unit 7 and other components are covered by the shielding cover 8, generation of electromagnetic noise and image noise is further suppressed.

Since the interface connector 72 is provided at the end-of-scan side end of the image processing unit 7 and the corresponding external connector 70 is attachable to and detachable from the connector 72 from the outside of the end-of-scan side end of the box 1, the front side of the image reading apparatus A is simplified and the operation of the apparatus is facilitated.

Because the shielded harness 701 which is bulky to deal with a high-speed image reading need not be routed in the box 1, reduction in thickness of the image reading apparatus A is easy also in this respect.

Since the inverter unit supporting plate 120 is provided and the inverter unit 91 which supplies electric power to the lamp 311 of the scanning unit 31 is mounted on the plate 120, the influence of heat of high temperature from the inverter unit 91 which can deal with an increase in the quantity of light of the lamp 311 to meet the demand for a high-speed image reading on the line sensor 52 and other components can be suppressed so that generation of image noise can be suppressed.

The junction boards 92 and 93, or further a cooling fan may be also mounted on the supporting plate 120 by utilizing the extra space in the inverter unit supporting plate 120. The motor 44 of the drive mechanism 4 can be also mounted.

Figure 7:
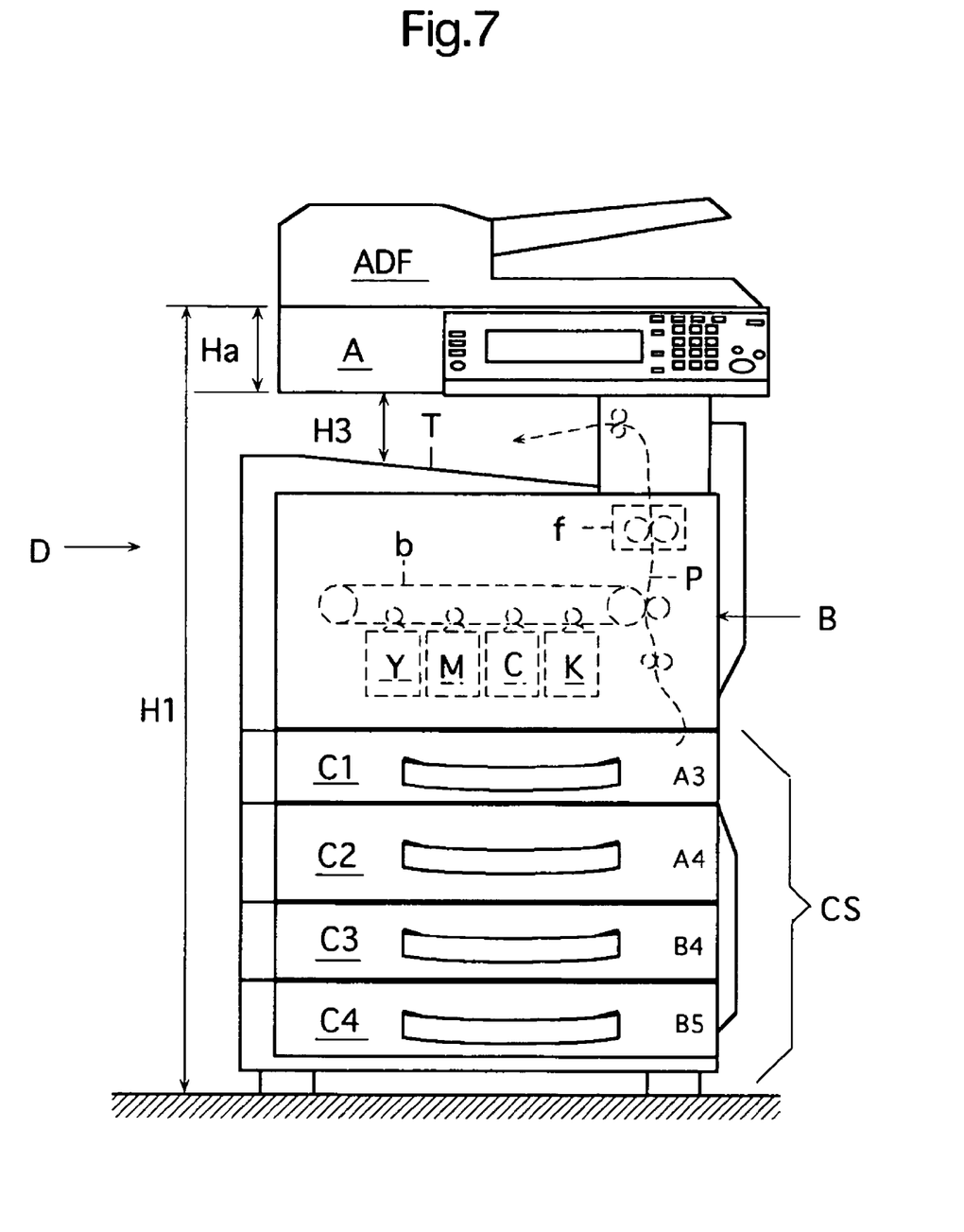
FIG. 7 is a front view of an example of an image forming apparatus according to the present invention.

FIG. 7 shows a copying machine D, which is an example of the image forming apparatus comprising the image reading apparatus A described above. This copying machine D also functions as a facsimile machine and also as a printer which carries out printing depending on the image information provided from a computer and the like.

The copying machine D comprises an image forming portion B as in the copying machine D' shown in FIG. 8 mentioned above and a portion CS having cassettes C1-C4 for accommodating recording mediums, and an automatic document feeder ADF mounted on the image reading apparatus A. The automatic document feeder ADF covers the original document S on the glass plate 21, transfers the original document S along the glass plate 21', and functions as an openable and closable cover. It should be noted that in FIG. 2, each of two parts 1200 provided on the rear side of the box 1 is a hinge mounting member for attaching the automatic document feeder ADF or a cover (not shown) in an openable and closable manner.

The image forming portion B can form a toner image on a recording medium by the electrophotography method. The image forming portion B in this example is a tandem type color image forming portion which comprises a yellow image formation unit Y, a magenta image formation unit M, a cyan image formation unit C and a black image formation unit K arranged along an intermediate transfer belt b. The image forming portion primarily transfers toner images formed by the image formation units onto the intermediate transfer belt b, secondarily transfers the multiple toner images which have been primarily transferred onto the belt b one above the other onto a recording medium P provided from one of the cassettes, and fixes the images on the medium P by a fixing apparatus f to obtain a full-color image.

The image forming portion B, however, may be other types of full-color image forming portions or monochrome image forming portions.

Since the copying machine D employs the image reading apparatus A whose vertical height Ha has been reduced and thickness has been reduced, even if the copying machine D is in the category of so-called high-speed machines and the recording medium capacity in the cassettes C1 to C4 is increased in correspondence with its high-speed property and a height H3 of a space above a recording medium discharge tray portion T is increased, the height position of the image reading apparatus A can be set in a range of height H1 that allows easy operation.

Even when a recording medium discharge tray is projected from the image forming portion B, a sorter and the like is additionally attached to the image forming portion B, and recording mediums are discharged thereto, the height position of the image reading apparatus can be set in a range of height that allows easy operation by employing the image reading apparatus A.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A box for an image reading apparatus, the box comprising a box body and a plate member, the box body comprising a rectangular frame and a base plate fixed on the rectangular frame, the plate member being disposed in the box body and fixed to the box body, the image reading apparatus comprising the box and component parts of the apparatus mounted on the box, the component parts being at least a transparent plate for supporting an original document, a first scanning unit disposed below the transparent plate to illuminate the original document on the transparent plate and reflect light reflected from the original document in an original document subscanning direction, a second scanning unit which reflects light reflected from the first scanning unit in turn reversely in the subscanning direction, a drive mechanism which drives the first and second scanning units in the subscanning direction, a reading block having a photoelectric image pickup element and an optical system which leads light reflected from the second scanning unit to the image pickup element to form an image, an A/D conversion board which converts an analog signal received from the image pickup element into a digital signal, and an image processing unit which carries out image processing based on the digital signal received from the A/D conversion board, wherein the plate member extends from an intermediate position in the subscanning direction of the box body toward one end side of the box body in the subscanning direction and has a dented area for placing the reading block without interfering with movement of the first scanning unit and a cutout portion formed from the dented area toward the one end side of the box body, the cutout portion being for disposing at least the image processing unit in such a state that the A/D conversion board is disposed between the reading block placed in the dented area and the image processing unit.

2. A box for an image reading apparatus, the box comprising a box body and a reinforcing member, the box body comprising a rectangular frame and a base plate fixed on the rectangular frame, the reinforcing member being disposed in the box body and fixed to the box body, the image reading apparatus comprising the box and component parts of the apparatus mounted on the box, the component parts being at least a transparent plate for supporting an original document, a first scanning unit disposed below the transparent plate and comprising, mounted thereon, a lump for illuminating the original document on the transparent plate and a first mirror for reflecting light reflected from the original document in an original document subscanning direction, a second scanning unit comprising, mounted thereon, second and third mirrors which reflect light reflected from the first mirror in turn reversely in the subscanning direction, a drive mechanism which drives the first and second scanning units in the subscanning direction, a reading block having a photoelectric image pickup element and a lens which leads light reflected from the second scanning unit to the image pickup element to form an image, an A/D conversion board which converts an analog signal received from the image pickup element into a digital signal, and an image processing unit which carries out image processing based on the digital signal received from the A/D conversion board, wherein the reinforcing member is a reinforcing plate member extending from an intermediate position in the subscanning direction of the box body toward end-of-scan side which is one end side of the box body in the subscanning direction and having a downwardly drawn area for placing the reading block without interfering with movements of the first and second scanning units, upwardly drawn areas which are adjacent to the downwardly drawn area on front side and rear side and a cutout portion formed from the downwardly drawn area toward the end-of-scan side of the box body in the subscanning direction, and the cutout portion being for disposing at least the image processing unit in such a state that the A/D conversion board is disposed between the reading block placed in the downwardly drawn area and the image processing unit.

3. The box for an image reading apparatus according to claim 2, wherein an inverter unit supporting member for mounting an inverter unit for supplying at least the illumination lamp with electric power is provided in a manner of projecting from rear side of the box toward outside of the box.

4. The box for an image reading apparatus according to claim 1, wherein a recess which faces the cutout portion of the plate member for admitting a lower end portion of the A/D conversion board through the cutout portion is formed on the base plate.

5. An image reading apparatus which comprises a box and component parts of the apparatus mounted on the box, the box comprising a box body and a plate member, the box body comprising a rectangular frame and a base plate fixed on the rectangular frame, the plate member being disposed in the box body and fixed to the box body, the component parts mounted on the box being at least a transparent plate for supporting an original document, a first scanning unit disposed below the transparent plate to illuminate the original document on the transparent plate and reflect light reflected from the original document in an original document subscanning direction, a second scanning unit which reflects light reflected from the first scanning unit in turn reversely in the subscanning direction, a drive mechanism which drives the first and second scanning units in the subscanning direction, a reading block having a photoelectric image pickup element and an optical system which leads light reflected from the second scanning unit to the image pickup element to form an image, an A/D conversion board which converts an analog signal received from the image pickup element into a digital signal, and an image processing unit which carries out image processing based on the digital signal received from the A/D conversion board, wherein the plate member of the box extends from an intermediate position in the subscanning direction of the box body toward one end side of the box body in the subscanning direction and has a dented area for placing the reading block without interfering with movement of the first scanning unit and a cutout portion formed from the dented area toward the one end side of the box body, and the reading block is mounted in the dented area of the plate member, and at least the image processing unit is disposed in the cutout portion of the plate member in such a state that the A/D conversion board is disposed between the reading block placed in the dented area and the image processing unit.

6. An image reading apparatus which comprises a box and component parts of the apparatus mounted on the box, the box comprising a box body and a reinforcing member, the box body comprising a rectangular frame and a base plate fixed on the rectangular frame, the reinforcing member being disposed in the box body and fixed to the box body, the component parts mounted on the box being at least a transparent plate for supporting an original document, a first scanning unit disposed below the transparent plate and comprising, mounted thereon, a lump for illuminating the original document on the transparent plate and a first mirror for reflecting light reflected from the original document in an original document subscanning direction, a second scanning unit comprising, mounted thereon, second and third mirrors which reflect light reflected from the first mirror in turn reversely in the subscanning direction, a drive mechanism which drives the first and second scanning units in the subscanning direction, a reading block having a photoelectric image pickup element and a lens which leads light reflected from the second scanning unit to the image pickup element to form an image, an A/D conversion board which converts an analog signal received from the image pickup element into a digital signal, and an image processing unit which carries out image processing based on the digital signal received from the A/D conversion board, wherein the reinforcing member of the box is a reinforcing plate member extending from an intermediate position in the subscanning direction of the box body toward end-of-scan side which is one end side of the box body in the subscanning direction and having a downwardly drawn area for placing the reading block without interfering with movements of the first and second scanning units, upwardly drawn areas which are adjacent to the downwardly drawn area on front side and rear side and a cutout portion formed from the downwardly drawn area toward the end-of-scan side of the box body in the subscanning direction, and the reading block is mounted in the downwardly drawn area of the reinforcing plate, and at least the image processing unit is disposed in the cutout portion of the reinforcing plate in such a state that the A/D conversion board is disposed between the reading block placed in the downwardly drawn area and the image processing unit.

7. The image reading apparatus according to claim 5, wherein the image processing unit is in a height position in a range of vertical height of the A/D conversion board.

8. The image reading apparatus according to claim 5, wherein an upper end of the A/D conversion board is in a height position lower than height position of an upper end of the reading block.

9. The image reading apparatus according to claim 5, wherein the A/D conversion board is supported on an A/D conversion board supporting member, the image pickup element is fitted into and disposed in a cutout portion formed on the A/D conversion board supporting member to be attached to an upper part of the A/D conversion board, and upper ends of the image pickup element and A/D conversion board are in height positions lower than height position of an upper end of the reading block.

10. The image reading apparatus according to claim 6, wherein the lens of the reading block is produced by cutting of upper and lower portions of a round lens to reduce its size in the height direction, and the upper end of the A/D conversion board is in a height position lower than the upper end face of the lens.

11. The image reading apparatus according to claim 10, wherein the image pickup element is attached to an upper part of the A/D conversion board, and upper ends of the image pickup element and A/D conversion board are both in height positions lower than the upper end face of the lens.

12. The image reading apparatus according to claim 6, wherein the reading block comprises a lens barrel which retains the lens and a light-blocking cover which covers at least a part of the lens barrel, extends from the lens barrel to the image pickup element and covers the image pickup element, and an upper end of the light-blocking cover is in the height position same as the upper end of the lens barrel or in a height position lower than the upper end of the lens barrel.

13. The image reading apparatus according to claim 12, wherein a stepped portion which is sunken into the lens barrel is formed at an end portion on light-blocking cover side of the lens barrel, and a lens barrel-side end portion of the light-blocking cover is fitted onto the stepped portion.

14. The image reading apparatus according to claim 6, wherein a dented portion which faces the cutout portion of the plate member is formed on the base plate of the box, and a lower end portion of the A/D conversion board is inserted into the dented portion through the cutout portion of the plate member.

15. The image reading apparatus according to claim 6, wherein the drive mechanism of the first and second scanning units comprise a rotation shaft extending in a main scanning direction of the original document at an end portion in the subscanning direction of the box, the image processing unit has an interface connector at an end portion in the subscanning direction of the image processing unit, and the interface connector is positioned lower than the rotation shaft of the drive mechanism so that a corresponding external connector can be attached to and detached from the interface connector from outside of the box.

16. The image reading apparatus according to claim 6, wherein a shielding cover covering the A/D conversion board, image processing unit and a harness which connects the A/D conversion board and image processing unit is provided, the drive mechanism of the first and second scanning units comprise a rotation shaft extending in a main scanning direction of the original document at an end portion in the subscanning direction of the box, and one end side portion in the subscanning direction of the shielding cover faces the rotation shaft from below so that it does not come into contact with the rotation shaft.

17. The image reading apparatus according to claim 6, wherein an inverter unit supporting member is provided on rear side of the box in a manner of projecting toward outside of the box, and an inverter unit which supplies at least the illumination lamp with electric power is mounted on the inverter unit supporting member.

18. The image reading apparatus according to claim 17, wherein at least one of a junction board for supplying power to the image reading apparatus, a junction board for inputting a control signal and a cooling fan is mounted on the inverter unit supporting member.

* * * * *